(12) United States Patent
Lee

(10) Patent No.: US 9,102,198 B2
(45) Date of Patent: Aug. 11, 2015

(54) PUNCTURE-FREE BULLET-PROOF TIRE

(71) Applicant: Jong Gyu Lee, Gyeongju (KR)

(72) Inventor: Jong Gyu Lee, Gyeongju (KR)

(*) Notice: Subject to any disclaimer, the term of this patent is extended or adjusted under 35 U.S.C. 154(b) by 0 days.

(21) Appl. No.: 14/222,824

(22) Filed: Mar. 24, 2014

(65) Prior Publication Data

US 2014/0360642 A1    Dec. 11, 2014

(30) Foreign Application Priority Data

Jun. 5, 2013    (KR) .................. 10-2013-0064648

(51) Int. Cl.
*B60C 7/00* (2006.01)
*B60C 7/10* (2006.01)
*B60C 19/12* (2006.01)

(52) U.S. Cl.
CPC ............ *B60C 7/105* (2013.04); *B60C 19/122* (2013.04); *Y10T 152/10387* (2015.01)

(58) Field of Classification Search
None
See application file for complete search history.

(56) References Cited

FOREIGN PATENT DOCUMENTS

| GB | 1147119 | * | 4/1969 |
| GB | 1466685 | * | 3/1977 |
| JP | 2004-3906 | A | 1/2004 |
| KR | 10-2004-0039067 | A | 5/2004 |
| KR | 2010038640 | * | 4/2010 |

OTHER PUBLICATIONS

Machine translation of KR 2010038640, no date.*

* cited by examiner

*Primary Examiner* — Justin Fischer
(74) *Attorney, Agent, or Firm* — Patent Office of Dr. Chung Park

(57) ABSTRACT

The present invention relates to a no-puncture bullet-proof tire, which can prevent a puncture, a tear or a rupture of a tire by a nail, a reinforcing bar piece, a steel plate piece, a bullet, or other various kinds of fragments, and can enable a vehicle to safely run at a high speed of about 100 kilometers or more per hour under a high temperature environment of about 60° C. or more and a low temperature environment of about −60° C. or less, by filling the inside of the tire with a mixture of silicon rubber and spherical EVA foam without an air pressure.

1 Claim, 3 Drawing Sheets

PUNCTURE-FREE BULLET-PROOF TIRE

CROSS-REFERENCE TO RELATED APPLICATIONS

This U.S. non-provisional patent application claims priority under 35 U.S.C. §119 of Korean Patent Application No. 10-2013-0064648, filed on Jun. 5, 2013, the entire contents of which are hereby incorporated by reference.

BACKGROUND OF THE INVENTION

The present invention disclosed herein relates to a no-puncture bullet-proof tire, and more particularly, to a no-puncture bullet-proof tire which can prevent a puncture, a tear or a rupture of a tire by a nail, a reinforcing bar piece, a steel plate piece, a bullet, or other various kinds of fragments, and can enable a vehicle to safely run at a high speed of about 100 kilometers or more per hour under a high temperature environment of about 60° C. or more and a low temperature environment of about −60° C. or less, by filling the inside of the tire with a mixture of silicon rubber and spherical Ethylene Vinyl Acetate (EVA) foam without an air pressure.

Generally, an axle of a vehicle running on streets is equipped with wheels rotated by a driving force generated by and transmitted from an engine when the engine operates. The wheels are equipped with tires that support the weight of a vehicle, alleviate an impact from a road, and transmit a driving force from an engine, a braking force, and a steering force to a road surface, maintaining the run of a vehicle. Such tires are classified into tube-embedded tires with a tube to keep air pressure and tubeless tires without a tube embedded therein.

Meanwhile, when a tire is punctured or is torn while a vehicle runs, a vehicle may lose balance and steering ability, and then may rear-end or may roll over into a large accident. In other words, when a puncture occurs, a vehicle may suddenly tilt toward the side of the punctured wheel and may undergo a standing wave phenomenon that causes the shaking of a rear part of the tire like a wave and reduces ride comfort and increases a frictional heat, causing the rupture of the tire. This may lead to additional secondary, tertiary and even higher order of accidents, interrupting safe driving.

Accordingly, in order to prevent the standing wave phenomenon, a tire injected with silica that is a liquid adhesive is once developed. However, even though the tire can avoid punctures that may be caused by a nail or fragment having a diameter of about 7 mm or less, the tire was not free from punctures caused by a larger nail or reinforcing bar having a diameter is about 7 mm or more. Also, since the technique is only applied to the tire-tread, there is a limitation in that the sidewall of a tire still risks a danger of puncture. Moreover, when an object that is not cylindrical like a nail but is planar like an iron plate or a knife is stuck in the tire, silica leaks and thus the tire has to be replaced. Meanwhile, an airless tire having a beehive-like hexagonal shape is once developed, but has a limitation in practicality due to excessive noise and vibration during the high speed driving of a vehicle Accordingly, constant research and development efforts are being made for solving the limitations as described above. There are Korean patent Applications 10-2002-0031991 ("Patent Document 1") and 10-2004-0039067 ("Patent Document 2") as related prior art.

Specifically, Patent Document 1, as shown in FIGS. 1 and 2, discloses a tire disposed at both ends of an axle that is installed under a vehicle body and transmits a driving force of a vehicle. The tire includes a rim 1 installed in the center of the tire, an elastic part 2 formed of silicon on the outer circumference of the rim 1 and having its own elasticity, and a tread part 3 formed of crude rubber on the outer circumference of the elastic part 2 to exert a driving force and a braking force, and a plurality of protruding parts 4 formed on the outer circumference of the elastic part 2 coupled to the tread part having a concave part corresponding to the plurality of protruding parts 4. Also, the elastic part 2 is molded to include air bubbles 5 that independently contain air, respectively, and allows the tread part to be coupled to the outer circumference thereof.

However, in the case of Patent Document 1, there is a limitation in that when a nail, a reinforcing bar piece or a piece of steel plate is stuck in the tire, air leaks out of the air bubbles in the corresponding part. Thus, when the tread part of the tire contacts the ground, an unevenness occurs due to a weak pressure of the air bubbles from which air leaks. Accordingly, a vehicle shakes and bounces such that a vehicle cannot run at a high speed. Also, the tire needs to be replaced whenever a nail, a piece of reinforcing bar, or a piece of steel plate is stuck as described above.

Patent Document 2, as shown in FIG. 3, discloses a wheel and tire 6 filled with rubber materials such as synthetic resin 7 and silicon, or other materials 8. Here, a material with smaller shock absorption is disposed at the side of the wheel, and materials with larger shock absorption such as synthetic resin 7, silicon, other material 8 and rubber material are sequentially and separately disposed thereafter.

However, in case of Patent Document 2 described above, when a vehicle equipped with the tire continues to run on a highway at about 100 kilometers or more per hour for a long time, the tire heats up to more than about 80 to 90 and loses the function as a tire due to softening of the synthetic resin or general materials filled in the tire. More specifically, since the tire pressure drops down and the tire elasticity drops down as well, the tire cannot endure the vehicle weight and is compressed, and a vehicle cannot run at a high speed. Shaking and bouncing of a vehicle occurs when a vehicle runs in cold winter of about −20° C. to about −40° C. due to the loss of elasticity caused by the hardening of synthetic resin, rubber material and general material. Additionally, since a material with smaller shock absorption is disposed at the wheel side and other materials with larger shock absorption such as synthetic resin, silicon, other materials, and rubber materials are separately disposed thereafter, the materials are softened at a high temperature of 80° C. or more and are hardened at low temperature of about −20° C. to −40° C. Accordingly, a vehicle cannot drive at a high speed.

SUMMARY OF THE INVENTION

The present invention provides a no-puncture bullet-proof tire, which can prevent a puncture, a tear or a rupture of a tire by a nail, a reinforcing bar piece, a steel plate piece, a bullet, or other various kinds of fragments, and can enable a vehicle to safely run at a high speed of about 100 kilometers or more per hour under a high temperature environment of about 60° C. or more and a low temperature environment of about −60° C. or less, by filling the inside of the tire with a mixture of silicon rubber and spherical Ethylene Vinyl Acetate (EVA) foam without an air pressure The embodiments of the present invention provide no-puncture bullet-proof tires including; silicon rubber and spherical EVA foam filled in the tire, wherein the silicon rubber and spherical EVA foam are mixed and filled at a mixture ratio of about 25 to about 35 parts by weight of spherical EVA foam with respect to about 100 parts by weight of silicon rubber, and the spherical EVA foam has a diameter of about 3 mm to about 6 mm.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

The present invention relates to a no-puncture bullet-proof tire, and a detailed description regarding the configuration and operation that can be easily known to those skilled in the art and the elements that are not directly related to the technical features of the present invention will be simply made or omitted.

Hereinafter, the no-puncture bullet-proof tire will be described in detail with reference to the accompanying drawings.

Figure 1:
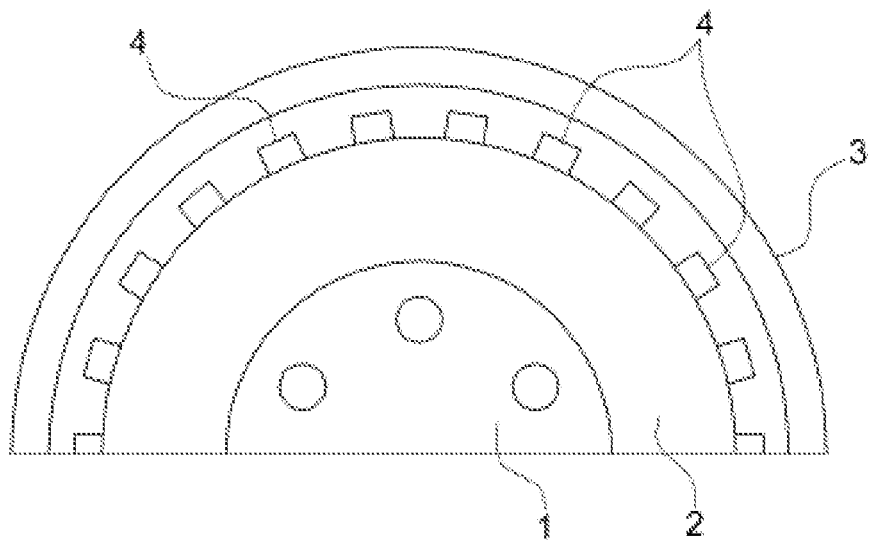
FIGS. 1 and 2 are views illustrating a tire according to Patent Document 1.
Figure 2:
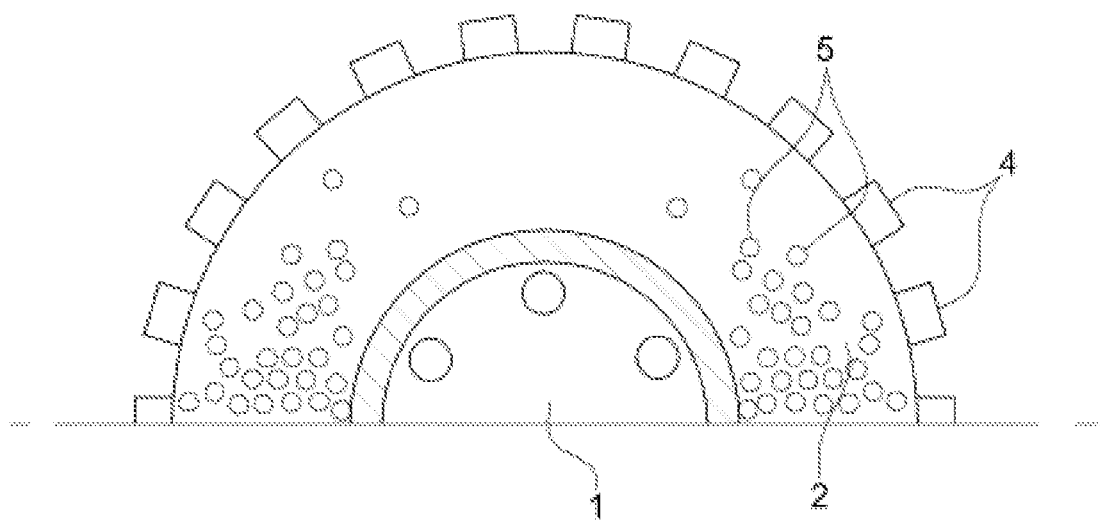
Figure 3:
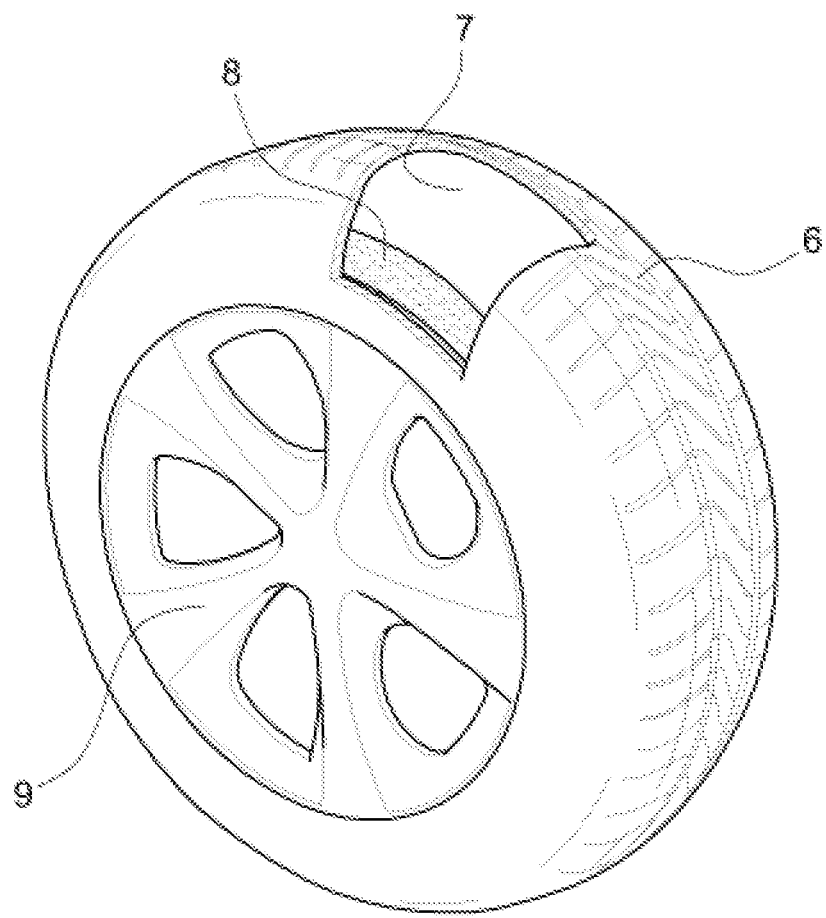
FIG. 3 is a view illustrating a tire according to Patent Document 2.
Figure 4:
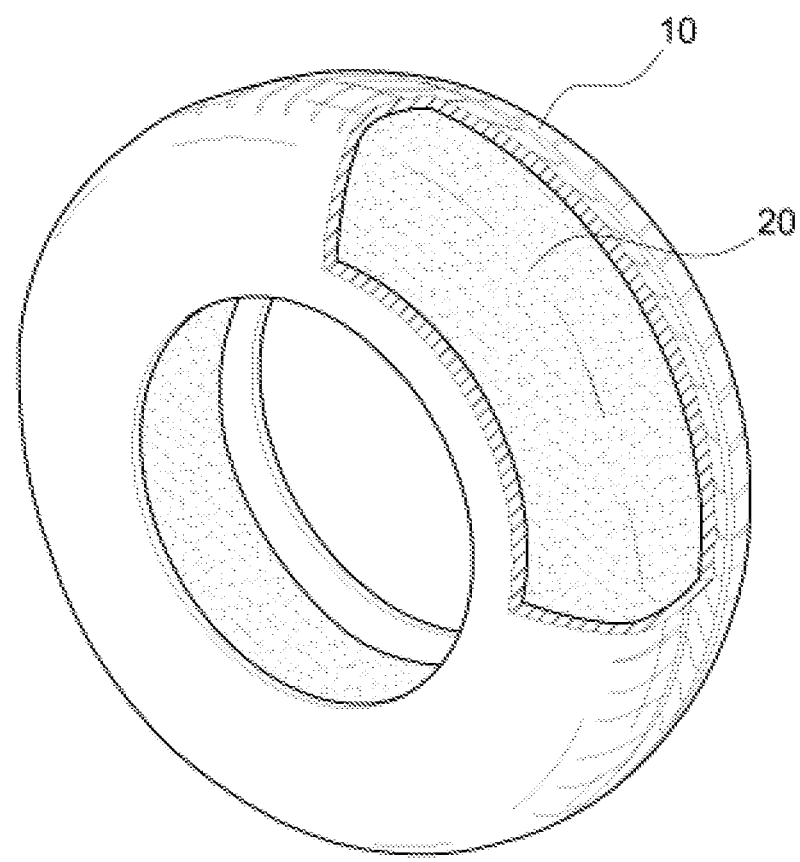
FIG. 4 is a view illustrating no-puncture bullet-proof tire according to an embodiment of the present invention.

FIG. 4 is a view illustrating a configuration of a no-puncture bullet-proof tire. The no-puncture bullet-proof tire may be filled with a mixture 20 of silicon rubber and spherical Ethylene Vinyl Acetate (EVA) foam.

Specifically, the no-puncture bullet-proof tire may be filled with a mixture of about 25 to about 35 parts by weight of spherical EVA foam with respect to 100 parts by weight of silicon rubber.

Silicon rubber used in the present invention may be a synthetic high molecular organic compound, the elasticity and properties of which are unchangeable even at about 250° C. and are unfrozen even at about −75° C., and may be a non-toxic and eco-friendly material. Also, silicon rubber may be a known material having various excellent properties such as compression resistance, chemical resistance, low-temperature flexibility, weather resistance, heat resistance, cold resistance, flame resistance, oil resistance, and water resistance.

Spherical EVA foam used in the present invention may be a known material that is highly expanded, which is added to realize high fuel efficiency, soft elasticity, better ride comfort, increased impact absorption and cost saving, compared to when silicon rubber is 100% filled.

Meanwhile, spherical EVA foam may have a diameter of about 3 mm to about 6 mm. For example, when the diameter of spherical EVA foam is less than 3 mm, spherical EVA foam may not be uniformly mixed with silicon rubber. Accordingly, spherical EVA foam needs to have a diameter of 3 mm or more. When the diameter of spherical EVA foam is more than 6 mm, puncture and bullet-proof functions may be reduced when stuck with a nail, a reinforcing bar piece or a steel plate piece. Accordingly, spherical EVA foam needs to have a diameter of 6 mm or less.

Additionally, when the content of spherical EVA foam is less than about 25 parts by weight, there may be no trouble with puncture and bullet-proof functions, but tire elasticity may decrease. Also, impact absorption becomes weak and ride comfort becomes bad upon high-speed driving. Since EVA is ten times cheaper and weighs five times lighter than silicon rubber as well, there may be no need to reduce the content of EVA into less than about 25 parts by weight in consideration of economic and functional characteristics such as fuel efficiency. Since the puncture and bullet-proof functions are reduced when the content of spherical EVA foam is more than about 35 parts by weight, the content of spherical EVA foam cannot exceed about 35 parts by weight Due to the configuration described above, the tire according to the embodiment of the present invention can prevent puncture, tear or rupture of a tire by a nail, a reinforcing bar piece, a steel plate piece, a bullet or other kinds of fragments, and can enable a vehicle to safely drive at a high speed of about 100 kilometers or more per hour under a high temperature environment of about 60° C. or more and under low temperature environment of about −60° C. or less.

Meanwhile, it will be understood that the no-puncture bullet-proof tire according to the embodiment of the present invention can be variously modified and changed from the spirit and scope of the present invention as described in the following claims, and the various modifications and changes may also fall within the scope of the present invention.

Since a vehicle tire puncture or rupture while running may cause a user not to perform his/her works or a vehicle tire explosion while running downhill may even kill or seriously injure passengers, thus causing immense trouble and damage to a user, a no-puncture bullet-proof tire according to an embodiment of the present invention may have the effect of enabling a driver to safely use a vehicle without worries by preventing puncture or rupture of the tire.

More specifically, filled with silicon rubber and EVA, the tire can exhibit about 100% the same elasticity as tires using compressed air, and has a variety of better effects than typical tires using compressed air.

Vehicles equipped with the tire can safely run at a high speed at about 100 kilometers or more per hour in a tropical region or desert of high temperature environments where the temperature is about 60° C. or more and in low temperature environments where the temperature is about −60° C. or less. Also, a driver of a vehicle suffers no trouble in driving a vehicle again after long parking, and the tire can be used without a puncture until the lifespan of the tire expires. Furthermore, when the lifespan of the tire expires, only silicon rubber inside the tire can be separated and recycled.

Here, the term 'recycle' means that even when the tire is out of use due to damages such as a tear or a rupture, silicon rubber inside the tire can be reused in a new tire for the same purpose even though there are damages such as tear or rupture on silicon rubber.

Furthermore, due to the excellence of silicon rubber itself in elasticity, tensile strength, heat resistance, cold resistance, and weather resistance, a vehicle may have no trouble in running at a high speed on a highway, an unpaved road, or a wet road at about 100 kilometers or more per hour even though a large nail having a diameter of about 10 mm or more, a large reinforcing bar piece, or a large steel plate piece is stuck in the tread or sidewall of the tire.

However, when high-speed running continues with a large nail, a large reinforcing bar piece or a large steel plate piece stuck in the tire, a slight vibration and/or a slight noise may occur due to the unbalance of wheels. In this case, when such foreign substances as a nail or a reinforcing bar piece are eliminated from the tire, a vehicle can still run at a high speed as usual.

In addition, the tire is outstanding in economy as a bullet-proof tire. The bullet-proof tires that are being widely used are very expensive due to the complex use of a variety of state-of-art materials, and air is injected into the innermost side of tires to alleviate the hardness due to the use of multiple layers of the various kinds of state-of-art materials and thus maintain the elasticity of tires when a vehicle runs. Since internal air leaks slowly when the tire is punctured by a bullet, a vehicle equipped with the tires can further run for about 100 kilometers at about 80 kilometers or more per hour. However, the tire needs to be replaced later after the driving. On the other hand, in the embodiment of the present invention, it was verified in a test that a vehicle equipped with the tire could run for several hours at 120 kilometers or more per hour when the tire was hit by a bullet that is about 70 mm in length and about 14 mm in diameter (e.g., a general pistol bullet is commonly about 5 mm in diameter and about 30 mm in length and a general machine gun bullet is commonly about 10 mm in diameter and about 50 mm in length).

Moreover, the tire according to the embodiments of the present invention cannot be applied only to motor vehicles, but also to bicycles, motorcycles, farming vehicles and heavy machinery vehicles.

Meanwhile, silicon rubber, which is formed of silicon, is cheap and economical. Also, the repair cost for puncture is not needed until the tire is worn out. Furthermore, when the lifespan of the tire expires, silicon rubber in the tire can be recycled, thereby achieving economic efficiency.

In the embodiments of the present invention, spherical EVA foam may be mixed with silicon rubber to be used in a tire. Since the specific gravity of silicon rubber is about 1.12 and the specific gravity of EVA is about 0.2, EVA is about five times lighter than silicon rubber, the fuel efficiency can be improved compared to when silicon rubber is used 100% to fill the tire. In addition, since EVA foam is highly expanded and thus serves as a sponge, elasticity of the tire, ride comfort, and shock absorbability can be improved when a vehicle runs on roads.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A puncture-free bullet-proof tire comprising;
silicon rubber and spherical Ethylene Vinyl Acetate (EVA) foam filled in the tire,
wherein the silicon rubber and spherical EVA foam are mixed and filled at a mixture ratio of about 25 to about 35 parts by weight of spherical EVA foam with respect to about 100 parts by weight of silicon rubber, and the spherical EVA foam has a diameter of about 3 mm to about 6 mm,
wherein a specific gravity of the EVA foam is 0.2.

* * * * *